United States Patent Office 3,697,446
Patented Oct. 10, 1972

3,697,446
CATALYST COATING METHOD
David G. Braithwaite, Chicago, Ill., assignor to Nalco Chemical Company, Chicago, Ill.
No Drawing. Filed Mar. 1, 1971, Ser. No. 120,040
Int. Cl. B01j 11/40
U.S. Cl. 252—455 Z                    6 Claims

ABSTRACT OF THE DISCLOSURE

A method for bonding zeolites to substrate such as silica-alumina wherein water is used to fill the pores of the substrate prior to placing a thin coating of silica thereupon and subsequently placing a coating of zeolite on the silica coated substrate.

INTRODUCTION

It is now known that zeolites and, in particular, certain synthetic zeolites known as molecular sieves, possess a high degree catalytic cracking activity for converting petroleum hydrocarbons. These zeolitic materials are most often used by incorporating them into matrices which may be inert or which possess catalytic activity.

It has been reasoned that if a substrate could be coated with catalytically active zeolites that an improved catalyst would be afforded since the so-called active sites of the zeolite would be exposed to the particular petroleum hydrocarbon stock being subjected to conversion by cracking processes.

Several proposals have been made for coating a variety of substrates with zeolitic materials. One proposal for coating zeolites on to catalyst bodies is described in U.S. 3,445,401. In this patent a gel adhesive is used to "glue" the zeolite to a cracking catalyst. This patent uses a slurry of alumina binder, catalyst, and zeolite. A series of subsequent process steps including filtration are described in order to produce a finished zeolite coated product.

In all of the proposals set forth in the prior art for coating zeolites on to cracking catalysts none have produced catalysts which are sufficiently useful to meet commercial standards of high cracking efficiency, long life, attrition resistance and economic attractiveness.

In most instances, the activity of the zeolite is lost due to improper coating or, when adhesive techniques are used to bond zeolites to a substrate, the activity seems to be masked due to the manufacturing technique used.

It is apparent that if a catalytically active zeolite could be bonded on to an appropriate catalyst substrate and improve the catalytic activity, a substantial advancement in the art of catalyst preparation and catalysis would be afforded.

OBJECTS OF THE INVENTION

It is, therefore, an object of the invention to provide an improved process for bonding zeolites to substrates, such as silica-alumina cracking catalysts or exhausted catalysts or equilibrium silica alumina cracking catalysts, whereby the activity of the finished coated substrate is greatly enhanced.

Other objects will appear hereinafter.

THE INVENTION

The invention provides a method of coating the surface of silica alumina cracking catalyst particles with catalytically active zeolites by the use of the following series of steps:

(A) The catalyst to be coated is treated with an amount of water sufficient to fill the pores and coat the surface thereof with at least a monolayer of water. Additional water may be used in treating the catalyst, but in any event it is critical to the invention that the amount of water is less than that amount necessary to produce a paste or a suspension. In many instances the catalyst particles treated with the water physically resemble a dry powder and do not have any visual indication of containing water.

(B) After the catalyst has been treated with water as described in step (A), the catalyst is then treated to place thereupon a thin coating of dense silica particles which have an ultimate particle size within the range of 2 to 150 millimicrons and a surface area ranging from 50 up to about 700 m.$^2$ g. These coatings are afforded by treating the water wet catalyst with aqueous colloidal silica sols which contain suspended therein particles of the type described.

(C) The final step in the coating process consists in uniformly admixing the silica coated catalyst produced in steps (A) and (B) with a catalytically active finely-divided zeolite for a period of time sufficient to place a coating of the zeolite on to the silica coated catalyst.

THE STARTING SILICA ALUMINA SUBSTRATES

The silica alumina substrates upon which are placed the zeolite coating are in the practice of this invention materials which possess catalytic cracking activity to some degree. They may, therefore, be referred to as cracking catalysts. These materials are well-known and include a wide variety of alumina-silicates which may be either of synthetic, natural or blends of natural and synthetic materials.

Most of the synthetic materials will contain a preponderance of silica with the amount of alumina being within the range of from 5–45% by weight. Natural materials such as clay catalysts may be coated in accordance with the teachings of the invention. Common clays which have catalytic activity are the kaolin clays which may or may not have been subjected to treatments such as acid washing or leaching. In certain cases commercial catalysts are prepared by blending clays such as kaolin with silica alumina hydrogels to produce a blend of synthetic-natural catalysts.

An excellent source of catalytic substrates are the so-called equilibrium cracking catalysts which are catalyts which have been removed from catalytic cracking units after they have been used to convert petroleum hydrocarbons.

In addition to using catalysts of the type described above, the invention contemplates using synthetic catalytic materials which have incorporated within their composition catalytically active zeolites. Also other metal oxides may be included in the catalyst structure, e.g. magnesium oxide. In any event all of the above type substrates may be treated in accordance with the invention to provide improved catalytic masses.

For a more detailed description with respect to cracking catalysts that may be used, reference may be had to Catalysis, by Paul H. Emmett, vol. 7, Reinhold (1960), which is incorporated herein by reference.

THE WATER TREATMENT

As indicated, an important part of this invention resides in treating the starting cracking catalyst with a specific amount of water. The amount of water should be sufficient to fill all of the pores of the catalyst and additionally place about the surface cracking catalysts at least a monolayer of water. Slight excesses of water over this amount may be used; however, the water should not be in such excess that the catalyst particles become excessively dampened to a point where a paste, or mortar-like material or aqueous slurry is formed.

From a manufacturing standpoint the moisturized catalyst will resemble a dry powder which still has good characteristics of powdery flow and is not sticky to the touch or in appearance.

The amount of water required to produce the above effects may be readily calculated based on the characteristics of the catalyst to be treated, e.g. surface area, pore volume, pore diameter and the particle size including the apparent bulk density of the particle. The water should be relatively free of undesirable ions such as sodium ions; thereby making the use of either distilled or deionized water beneficial.

THE COATING WITH THE SILICA PARTICLES

The water-treated catalyst is then coated with silica particles to place on or about the surface of the catalyst particles from 1–50% by weight of dense silica particles having an ultimate particle size range of from 2–150 millimicrons. The ultimate particle size of the silica is most preferably within the range of 10–30 millimicrons. These particles are spherical in shape.

While the amount of silica placed on the catalyst may vary from 1 up to about 50% by weight, amounts ranging from 3–10% by weight will give good results in most cases. The silica particles of the type described form an adhesive surface on the catalyst particles which allow the zeolite to be bonded thereto. The silica particles are derived from aqueous colloidal silica sols which contain particles of the type described dispersed therethroughout.

Typical aqueous colloidal silica sols useful in coating the catalysts of the invention are set forth below in Table I:

TABLE I

| Nalcoag | 1030 | 1034A | 1035 | 1050 | 1060 | 1130 | 1140 |
|---|---|---|---|---|---|---|---|
| Percent colloidal silica, as $SiO_2$ | 30 | 34 | 35 | 50 | 50 | 30 | 40 |
| pH | 10.2 | 3.1 | 8.6 | 9.0 | 8.5 | 10 | 10 |
| Average particle size, millimicrons | 11–16 | 16–22 | 16–22 | 17–25 | 40–60 | 8 | 15 |
| Average surface area, $M.^2/gram$ | 190–270 | 135–190 | 135–190 | 120–176 | 50–75 | 375 | 200 |
| Specific gravity at 68° F. | 1.205 | 1.230 | 1.255 | 1.385 | 1.390 | 1.214 | 1.296 |
| Viscosity at 77° F., percent cps | <5 | <5 | 5 | 70 | 5–10 | 7 | 8 |
| $Na_2O$, percent | 0.4 | <0.01 | 0.10 | 0.30 | 0.10 | 0.65 | 0.4 |

Since it is desirable the finished catalyst produced by the invention contains a low amount of sodium, a product such as Nalcoag 1034A shown in Table I represents a preferred silica sol.

The silica sols are used to treat the catalysts by being diluted with water to produce a convenient workable silica concentration, expressed as $SiO_2$, of about 3–15% by weight. The silica sol is then mixed with the water-treated catalyst whereby the required amount of silica is placed on the particles.

It is important that when the aqueous silica sols are mixed with the catalysts that a mortar, paste or slurry consistency be avoided. While it is difficult to give any set rule with respect to the amount of water furnished by the silica sol in relation to the treatment of water-containing catalyst, it may be stated that the silica coated catalyst have the appearance of a slightly dampened mass that still possesses particle integrity. A simple description of the silica sol treated catalyst is that it resembles lightly dampened sand from the standpoint of consistency. The silica sol should be uniformly admixed by mulling, grinding or the like to place about the catalyst particles the coating of silica particles.

THE ZEOLITES

After the silica particles have been placed on the catalyst surface the coated catalyst is then dry-mixed with the zeolite particles to produce a coating thereabout. This coating is accomplished without the addition of any water or other liquid. After the coating is completed the catalyst is then subjected to other treatments which will be described hereinafter. They are then calcined and steamed, at which time the catalyst is ready for use.

The zeolites used in the practice of the invention are crystalline alumina silicates which are finely-divided crystalline materials having in most instances particle sizes at least twice as fine as the catalyst particle that they are coated upon.

Typical materials will have a particle size ranging between 1–65 microns. Preferred zeolites are the synthetic alumina silicates known as molecular sieves, which have the general formula:

$$M_{n/2}O:Al_2O_3:XSiO_2:YH_2O$$

A preferred molecular sieve is crystalline zeolite Y, which is described in U.S. 3,130,007.

Other synthetic zeolites are described in detail in the following U.S. patents: 2,882,244 and 3,216,789.

In order to optimize the activity of the finished catalysts it is desirable that they be placed in a metal form which may be certain metals of the type described in U.S. 3,236,762 or treated with one or more rare earth chlorides and then connected to the rare earth oxide form, which latter procedure provides a finished catalyst having superior activity. The use of rare earth chlorides to treat molecular sieve catalyst of the conventional type are described in U.S. 3,140,253.

The amount of zeolite placed on the catalyst to produce a good cracking catalyst may vary in amount ranging from 1–30%. Excellent results are achieved when the amount of zeolite ranges from 5–15%.

In addition to using molecular sieves of the type described above, the invention contemplates utilizing catalyst fines whch contain molecular sieves. Typical equilibrium cracking catalysts used commercially contain about 10% by weight of molecular sieves. In the normal operation of cracking processes the catalysts decompose and produce fines which are rich in molecular sieves, e.g. contain 20–40% by weight of molecular sieves.

It is common practice in the catalyst industry to collect these fines in such devices as wet scrubbers. These fines, in addition to being rich in molecular sieves, are sufficiently comminuted in size that they can be readily adhered to the surfaces of various types of catalysts using the teachings of the invention. Therefore, these sieve-containing fines are considered for the purposes of this invention as being included in the definition of the term "catalytically-active zeolite."

EXAMPLES

To illustrate the practices of the invention the following is given by way of examples:

Example I

The following represents the ingredients used to prepare the coated catalyst:

|  | Gm. |
|---|---|
| Calcined catalyst | 600 |
| Water | 220 |
| Nalcoag 1034A | 124 |
| Sieve Y | 60 |

The starting catalyst was an equilibrium catalyst which contained about 25% alumina, with the balance being silica.

The catalyst was hand-mixed with first the water and then the Nalcoag until uniform. The dry sieve was then added and the hand-mixing continued until uniform again. The mixture was then dried at 200° C. for 4 hours, passed through a 100 mesh screen, washed with water by decantation to remove fines and then dried and calcined at 1100° F. for 2 hours. The product was then divided into 2 parts. One part was placed in a fluidizer and the other held for cracking evaluation. In the washing step very little of the sieve was washed off as indicated by the cloudiness of the wash water.

Subjecting the thus prepared catalyst after calcination and steaming to laboratory cracking evaluation studies the following results were obtained:

|  | Percent |
|---|---|
| Conversion | 48.3 |
| Gasoline | 34.50 |
| $C_4$ | 4.00 |

The catalyst without the zeolite coating produced a conversion rate of 35%, a gasoline yield of 26.5% and a C4 fractionation of 6.5%.

The molecular sieve used in the above catalyst was in the rare earth form.

Example II

Using the same technique described in Example I the following materials were used to prepare a Y sieve coated catalyst:

|  | Gm. |
|---|---|
| Calcined catalyst | 600 |
| Nalcoag 1034A | 124 |
| Water | 220 |
| Y sieve rare earth form | 60 |

The starting catalyst was a blend of synthetic material and clay. It contained 40% of kaolin clay with the alumina content of the synthetic portion of the catalyst being 25%. The yields from this catalyst are set forth below:

|  | Percent | Steamed, percent |
|---|---|---|
| Conversion | 54.68 | 54.35 |
| Gasoline | 40.12 | 39.92 |
| Coke | 3.30 | 3.42 |

A typical analysis of the rare earth oxides is as follows: $La_2O_3$ 40–45%, $CeO_2$ 1–2%, $Pr_6O_{11}$ 8–12%, $Nd_2O_3$ 32–37%, $Sm_2O_3$ 3–6%, $Gd_2O_3$ 2–4%, $Y_2O_3$ 0.2–1.0%, others 1–2%.

Example III

Using the same procedure as Example II, 90 gm. silica alumina catalyst fines containing 20% by weight of sieve Y were substituted for Y sieve of Example II. A finished coated catalyst was produced that gave a high conversion with a good gasoline yield.

The silica alumina cracking catalysts which are coated by the practice of the invention include those catalysts used in both fixed and moving bed cracking processes.

What is claimed is:

1. A method of coating the surface of a silica alumina cracking catalyst particle with a catalytically active zeolite which comprises the steps of:
   (A) treating said catalyst with an amount of water sufficient to fill the pores and coat the surface thereof with at least monolayer of water but less than an amount of water to produce a paste or suspension;
   (B) placing on the thus treated catalyst a coating of dense, silica particles whose ultimate particle size is within the range of 2–150 m$\mu$.; and then
   (C) admixing with said catalyst particles of a catalytically active zeolite with the weight percent of said zeolite particles to said catalyst being from 1–30%.

2. The method of claim 1 where the catalytically active zeolite is zeolite Y, the silica particles have an ultimate particle range of from 10–30 m$\mu$ and are coated on the catalyst to provide from 3–10% by weight based on said catalyst and the weight percent of said Y sieve particles to said catalyst is from 5–15%.

3. The method of claim 2 where the catalyst particles contain from 5 to 40% by weight of $Al_2O_3$.

4. The method of claim 1 where the catalyst is a blend containing natural clay.

5. The method of claim 2 where the Y sieve has been exchanged with a rare earth metal.

6. The method of claim 1 where the catalytically active zeolite is in the form of catalyst fines which contain zeolite particles.

References Cited

UNITED STATES PATENTS

| 3,275,571 | 9/1966 | Mattox | 252—455 Z |
| 3,207,701 | 9/1965 | Cuetin | 252—455 Z |
| 3,239,471 | 3/1966 | Chin et al. | 252—455 Z |
| 3,244,643 | 4/1966 | Schwartz | 252—455 Z |
| 3,296,151 | 1/1967 | Heinze et al. | 252—455 Z |

CARL F. DEES, Primary Examiner

UNITED STATES PATENT OFFICE
CERTIFICATE OF CORRECTION

Patent No. 3,697,446          Dated October 10, 1972

Inventor(s) David G. Braithwaite

It is certified that error appears in the above-identified patent and that said Letters Patent are hereby corrected as shown below:

Column 4, line 9 for "$M_{n/2}O:Al_2O_3:XSiO_2:YH_2O$" reads -- $M_{\frac{2}{n}}O:Al_2O_3:XSiO_2:YH_2O$ --

Column 4, line 30 for "whch" reads -- which --

Signed and sealed this 10th day of April 1973.

(SEAL)
Attest:

EDWARD M. FLETCHER, JR.　　　　　　ROBERT GOTTSCHALK
Attesting Officer　　　　　　　　　　Commissioner of Patents